Patented June 27, 1939

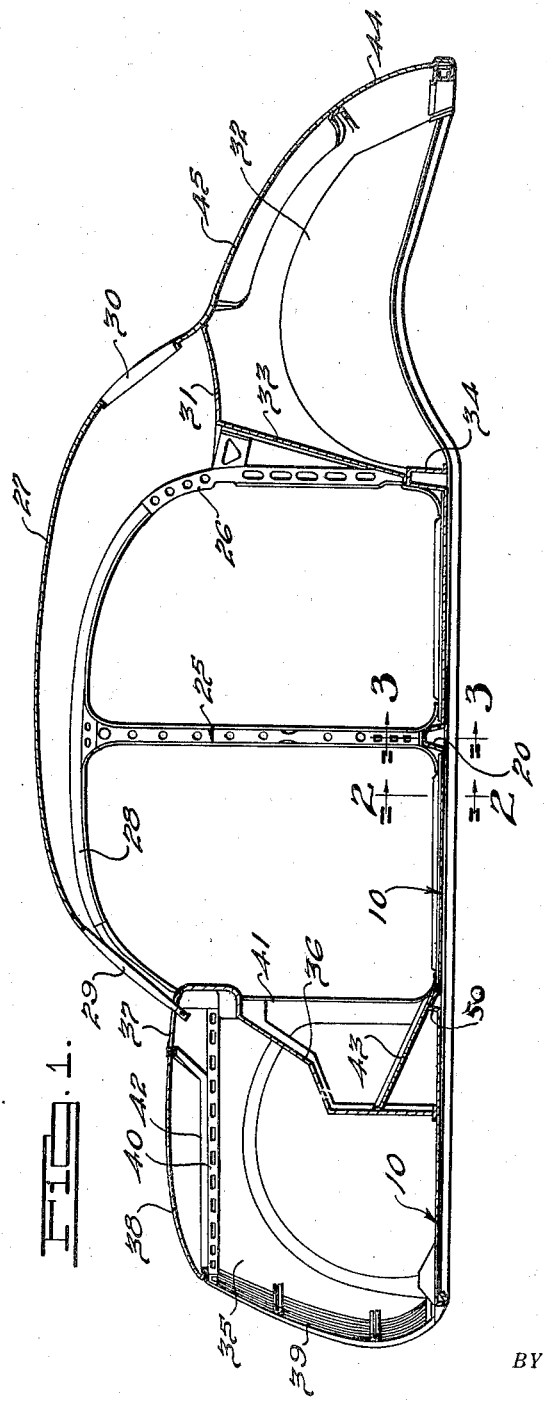

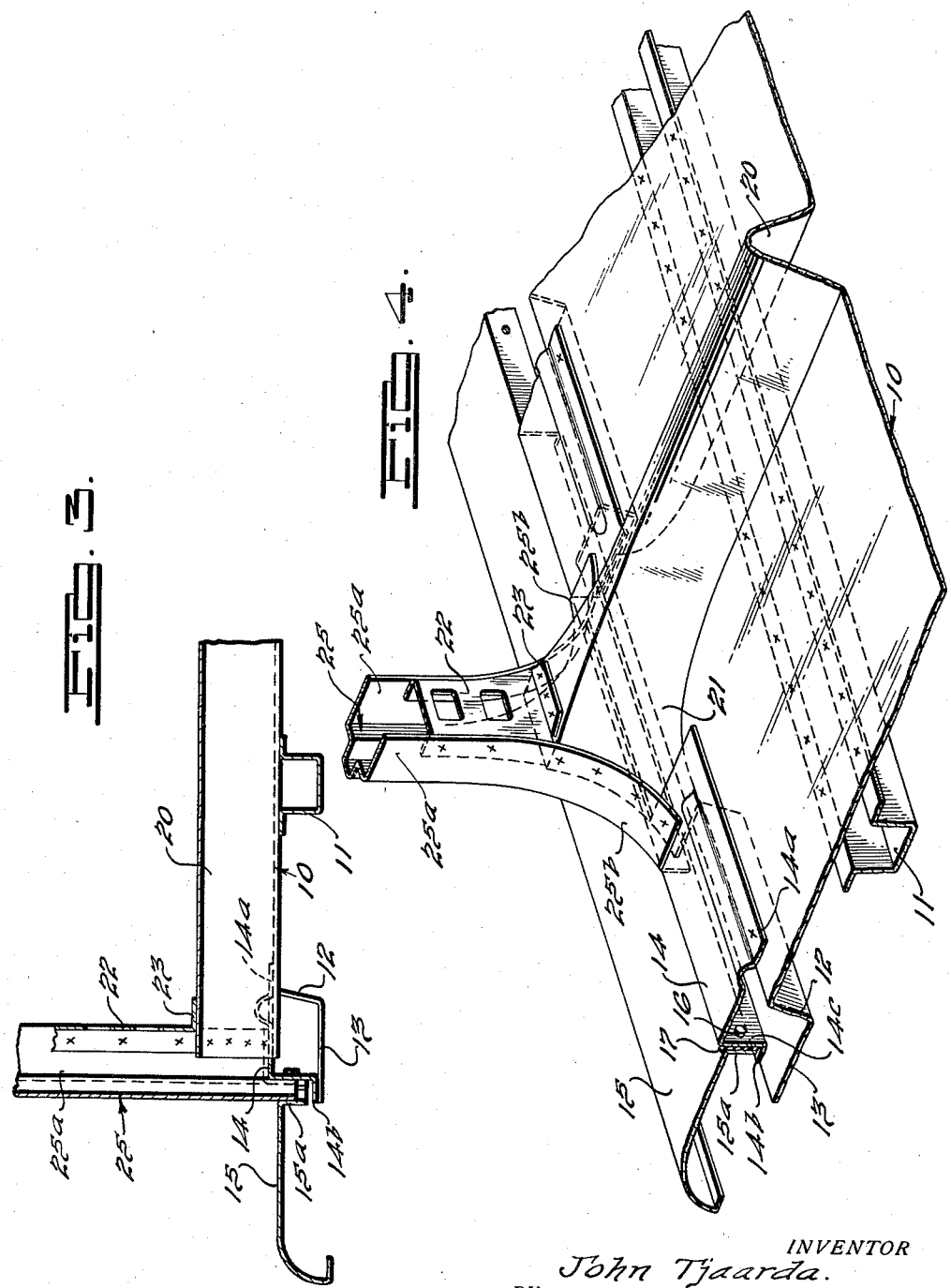

2,164,098

UNITED STATES PATENT OFFICE 2,164,098

AUTOMOBILE BODY

John Tjaarda, Birmingham, Mich., assignor to Briggs Manufacturing Company, Detroit, Mich., a corporation of Michigan Application October 22, 1937, Serial No. 170,476

9 Claims. (Cl. 296—28)

This invention relates to motor vehicle bodies and more particularly to bodies of the unitary body and frame or chassis type.

An object of the invention is to provide a body of the foregoing character having great strength and durability, one which is of simplified construction and consequently relatively less expensive to manufacture than previous bodies of fabricated construction.

Another object of the invention is to provide a body in which the pressed or stamped metal floor structure or pan includes the chassis cross frame member.

A further object of the invention is to provide a vehicle body having a pressed metal floor pan embodying an integrally formed or pressed cross frame member or members connected at opposite ends to the upright side frame members or pillars.

An additional object is to provide a combined floor pan and cross frame member structure of the foregoing nature in which the cross frame member is formed up so as to extend into the passenger compartment of the vehicle to provide a foot rest for the rear seat occupants.

Other objects and advantages of the invention will appear in the following description and appended claims, reference being had to the accompanying drawings forming a part of this specification wherein like reference characters designate corresponding parts in the several views.

In said drawings:

Fig. 1 is a longitudinal vertical sectional view through a vehicle body embodying the present invention.

Fig. 2 is a transverse vertical sectional view, partly in elevation, taken substantially along the line 2—2 of Fig. 1, looking in the direction of the arrows.

Fig. 3 is a fragmentary transverse vertical sectional view, on an enlarged scale, taken substantially along the line 3—3 of Fig. 1, looking in the direction of the arrows; and Fig. 4 is a fragmentary perspective view, on an enlarged scale, of the vehicle floor structure embodying the present invention.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a motor vehicle of the unitary chassis and body type similar to that disclosed in my copending application Serial No. 114,613, filed December 7, 1936, and embodying the present invention. It will be understood that the invention in its broader aspects is not limited to a body designed and constructed as illustrated in said application. In the present preferred form of the invention the body structure is adapted for a partially streamline motor vehicle with the unitary engine and driving wheels assembly mounted at rear thereof. However, it is to be understood that the invention may be adapted with suitable changes in design to other types of automobile vehicles, such for example, as to front driven vehicles with front mounted engines.

Referring particularly to Fig. 1, there is shown a longitudinal section of a body of the foregoing character in which the present invention is incorporated. The body, as shown, comprises a floor structure or unit including a pressed sheet steel floor pan 10 which is mounted upon and secured to, in any suitable manner, as by welding, a pair of transversely spaced longitudinally extending chassis side frame members 11. The floor structure supports at its longitudinal side edges upright or vertical side frame members or body pillars 25 which, as shown, are preferably of channel formation having inwardly directed flanges 25a. There are also provided front and rear pressed metal body pillars 26. These several pillars support the roof unit or panel 27 which covers the entire top of the passenger compartment and is secured, in any suitable manner, to roof rails 28. The front portion of the roof panel extends downward and terminates at the windshield opening 29, while its depending rear portion is provided with an opening 30 for the rear window, its rear edge being adapted to be joined by welding with a sheet 31 covering the engine compartment 32. The sheet 31 is extended to form a partition 33 separating the passenger compartment from the engine compartment and is secured at its lower edges to a transverse bulkhead 34.

In front of the passenger compartment there is provided a luggage and spare tire compartment 35 which is formed preferably by continuations of the side walls of the body compartment, dash 36, floor 10 and top sheet 37, the latter having an upwardly opening lid or bonnet 38. As shown, the luggage compartment is in a form resembling the engine compartment of conventional motor vehicles with front mounted engines. A grille 39 arranged at the front of the compartment serves for ornamental purposes simulating the conventional radiator grilles. Horizontally extending members 40 secured at their extremities to the grille 39 and to front vertical members 41, carry a lid supporting frame 42 to which the lid or bonnet 38 is hinged. The front portion of the passenger compartment is provided with an inclined metal foot board 43. A suitably shaped rear panel 44 is provided to cover the engine compartment 32 and the same is provided with a hinged lid 45 permitting access to the engine. As thus far described the body of the present invention is, in all respects, substantially like that of my above mentioned co-pending application.

Referring now particularly to Figs. 2 to 4 inclusive, the longitudinal side edges of the floor pan 10 are offset downwardly at 12 and are provided with offset outwardly extending portions or flanges 13. These flanges support outer side sill members 14 which have inwardly and outwardly directed flanges 14a and 14b, respectively, which are welded to the pan 10 and to the flange 13 thereof. Thus the pan 10 and the sills 14 provide a unitary floor structure. The vertical portions 14c of the sills provide means for securing pressed sheet steel running boards 15 to the floor structure. A vertical inner flange 15a on the running board is secured to the vertical portion 14c of the sill by bolts or the like 16, there being a strip of non-metallic material 17 interposed between the running board flange 15a and the part 14c which serves as a seal or sound deadening gasket to prevent rattling and metallic noises.

As best seen in Fig. 4, the body pillar 25 has inwardly directed vertical flanges 25a and at its lower end these pillar flanges are flared outwardly to provide extension flanges 25b. The floor pan 10 is formed or pressed up to provide a transversely extending arched deep rib-like projection 20 which is flared outwardly or enlarged at its opposite ends at 21 to fit and be secured, as by spot welding, to the inner faces of the flared portions 25b of the pillar flanges. A reenforcing channel or gusset member 22 is set into the pillar 25 and is secured to the pillar flanges 25a by welding. The lower portion of the channel member 22 has an inwardly directed substantially horizontal flange or portion 23 which is welded to the widened top face of the arched cross frame member 20. It will be understood that the member 20 of the floor pan is secured by its enlarged ends or extremities 21 to the opposed upright pillars 25 and thus materially reenforces the body structure. The floor pan thus provides the entire cross bracing between the lower ends of the body pillars, the integral upstanding rib 20 forming a rigid tie between the pillars and also the longitudinal frame members 11. Moreover, this integrally formed cross frame member 20 extends or projects upwardly into the passenger compartment and thus is capable of functioning in addition as a foot rest for the rear seat passengers. The integral cross frame member or portion 20 of the floor pan may be made of any suitable structural shape, although it is preferred that it be pressed up into inverted channel shape. It will be understood that the metal floor pan is also preferably formed to provide generally similar upstanding inverted channel shaped cross frame members, such as the rear transverse bulkhead 34 and the front transverse member 50, joining in like manner the lower ends of the rear opposed body pillars or posts 26 and the front opposed pillars or posts 41, respectively.

By virtue of the present invention it is possible to provide a floor structure or unit in which the cross frame member of the chassis or floor structure may be formed integrally with the floor pan by a stamping or pressing operation. This eliminates the necessity of a separate conventional type of cross frame member which was ordinarily disposed beneath the floor pan and secured thereto and to the longitudinal frame members and side sills by a series of welding operations, rivets, or bolts. By forming or shaping the floor pan to provide the brace or reenforcing portion 20 which serves to take the place of a conventional cross frame member, the cost of production of a body of the foregoing character is considerably reduced over the cost of previous conventional bodies, without sacrificing strength or rigidity of the body.

I claim:

1. In a motor vehicle body having a passenger compartment, a pair of spaced longitudinal frame members, a pressed metal floor pan secured to said frame members, opposed substantially vertical pillars, and a structural cross frame member formed from and being integral with said floor pan and secured at its opposite ends to the lower ends of the pillars.

2. In a motor vehicle of the unitary body and chassis type having a passenger compartment, a pair of spaced longitudinal frame members, a pressed metal floor pan mounted on said frame members, opposed substantially vertical pillars, a metal roof sheet forming connecting means transversely between the upper ends of said pillars, and an upstanding structural cross frame member pressed from the metal of said floor pan and secured at its opposite ends to the pillars.

3. In a motor vehicle body having a passenger compartment, a pair of longitudinal frame members, a pressed metal floor pan secured to said frame members, substantially vertical pillars secured by their lower extremities to the floor pan, and a metal roof sheet forming connecting means transversely between the top extremities of said pillars, said floor pan having an integral inverted substantially U-shaped cross frame member extending transversely thereof and connected at its opposite ends to said pillars.

4. In a motor vehicle body having a passenger compartment, a pair of longitudinal frame members, a pressed metal floor pan secured to said frame members, substantially vertical pillars of channel formation having inwardly directed flanges and secured by their lower extremities to the floor pan, a metal roof panel forming connecting means transversely between the top extremities of said pillars, and a structural cross frame member substantially of channel formation forming an integral part of said floor pan and secured at its opposite ends to the flanges of said pillars.

5. In a motor vehicle body having a passenger compartment, a pair of spaced longitudinal frame members, upright body pillars, a pressed metal roof sheet forming connecting means transversely between the top extremities of said pillars, and a pressed metal floor pan mounted on said frame members and having an integral inverted channel member projecting upwardly therefrom and extending transversely thereof, the ends of said channel member being secured to the lower ends of said pillars and providing a cross frame member for the body.

6. In a motor vehicle body having a passenger compartment, a pair of spaced longitudinal frame members, opposed substantially vertical frame members, a metal roof sheet forming connecting means transversely between the top extremities of said vertical frame members, and a pressed metal floor pan mounted on said longitudinal frame members and having a substantially U-shaped upstanding rib formed therein extending transversely thereof and secured at its opposite ends to said vertical frame members, said rib providing a cross frame member for the body and a foot rest for the passenger compartment.

7. In a motor vehicle body having a passenger compartment, a floor structure, opposed substantially vertical frame members secured by their lower extremities to the floor structure at the longitudinal edges thereof, a metal roof sheet forming connecting means transversely between the top extremities of said vertical frame members, and a metal floor pan forming a part of said floor structure having an arched portion extending transversely thereof and secured at its opposite ends to said vertical members, said arched portion providing a cross frame member and a foot rest.

8. In a motor vehicle body having a passenger compartment, a pair of longitudinal base frame members, front and rear pairs of substantially vertical body pillars, a metal roof sheet connecting the upper ends of said pillars, and a sheet metal floor pan having a continuous transversely extending upstanding rib or ribs formed from the metal of said floor pan and secured at opposite ends to a pair or pairs of said pillars and providing a cross frame member or members, one of said cross frame members also providing a foot rest within the passenger compartment.

9. In a motor vehicle of the unitary body and chassis type having a passenger compartment, a pair of side frame members, a floor structure including a floor pan secured to said side frame members, a plurality of substantially vertical pillars secured by their lower extremities to the floor structure at the longitudinal edges thereof, a metal roof sheet forming a connecting means transversely of the body between the top extremities of said vertical pillars, and said floor structure having an integral continuous transversely extending upstanding portion formed from the material of said pan and secured at its opposite ends to said vertical pillars providing a cross frame member and foot rest within the passenger compartment.

JOHN TJAARDA.